(12) United States Patent
Schaupp et al.

(10) Patent No.: US 11,692,433 B2
(45) Date of Patent: Jul. 4, 2023

(54) FLUID LEVEL MONITORING SYSTEM AND METHOD INCORPORATING PRESSURE SENSOR SYSTEM HAVING INFLATABLE/COLLAPSIBLE BAG

(71) Applicant: Q.E.D. Environmental Systems, Inc., Dexter, MI (US)

(72) Inventors: John F. Schaupp, Sylvania, OH (US); William C. Allen, Ypsilanti, MI (US)

(73) Assignee: Q.E.D. Environmental Systems, Inc., Dexter, MI (US)

( * ) Notice: Subject to any disclaimer, the term of this patent is extended or adjusted under 35 U.S.C. 154(b) by 0 days.

(21) Appl. No.: 17/873,529

(22) Filed: Jul. 26, 2022

(65) Prior Publication Data

US 2022/0356801 A1    Nov. 10, 2022

Related U.S. Application Data

(63) Continuation of application No. 16/962,662, filed as application No. PCT/US2019/013829 on Jan. 16, 2019, now Pat. No. 11,408,274.

(Continued)

(51) Int. Cl.
*E21B 47/047* (2012.01)
*E21B 47/06* (2012.01)
*G01F 23/14* (2006.01)

(52) U.S. Cl.
CPC ............ *E21B 47/047* (2020.05); *E21B 47/06* (2013.01); *G01F 23/14* (2013.01)

(58) Field of Classification Search
CPC ............................... E21B 47/047; E21B 47/06
See application file for complete search history.

(56) References Cited

U.S. PATENT DOCUMENTS 3,184,965 A    5/1965    Philippe
4,109,531 A    8/1978    Lawford et al.
(Continued)

FOREIGN PATENT DOCUMENTS

CN    1131416 C    12/2003
CN    104154966 A    11/2014
(Continued)

OTHER PUBLICATIONS

Extended European Search Report for EP Application No. 19741680.3, dated Sep. 20, 2021, pp. 7.
(Continued)

*Primary Examiner* — Shane Bomar
(74) *Attorney, Agent, or Firm* — Kinney & Lange, P.A.

(57) ABSTRACT

The present disclosure relates to a fluid level sensing system for sensing a fluid level in a well. The system has an upper housing in communication with a lower housing, with the lower housing having a first bore in communication with a fluid in the well, and a second bore isolated from the first bore and in communication with at least one of a vacuum gauge or an external vacuum source. The upper and lower housings house a first flexible bag and a second flexible bag, with the first bag housed within the second bag. A portion of the first bag communicates with the first bore and is responsive to a change in pressure within the first bore caused by a changing fluid level in the well. A portion of the second bag communicates with the second bore and exerts a reference pressure on the first bag. A sensing subsystem senses expanding and contracting movement of the bags and generates a signal indicative of a change in a level of the fluid in the well.

20 Claims, 10 Drawing Sheets

Related U.S. Application Data

(60) Provisional application No. 62/699,919, filed on Jul. 18, 2018, provisional application No. 62/617,881, filed on Jan. 16, 2018.

(56) References Cited

U.S. PATENT DOCUMENTS

| | | | |
|---|---|---|---|
| 4,345,647 | A | 8/1982 | Carmichael |
| 4,375,764 | A | 3/1983 | Lawford et al. |
| 4,549,164 | A | 10/1985 | Tewfik |
| 5,063,778 | A | 11/1991 | Jorritsma |
| 6,036,296 | A | 3/2000 | Axtell et al. |
| 9,988,887 | B2 | 6/2018 | Meyer et al. |
| 2008/0271526 | A1 | 11/2008 | Hewitt |
| 2009/0224929 | A1 | 9/2009 | Harper |
| 2010/0281971 | A1 | 11/2010 | Beneker et al. |
| 2010/0308589 | A1 | 12/2010 | Rohrer |
| 2011/0139723 | A1 | 6/2011 | Griffin et al. |
| 2012/0067119 | A1 | 3/2012 | Cronin et al. |
| 2012/0096938 | A1 | 4/2012 | Edwards |
| 2014/0033817 | A1 | 2/2014 | Scheldorf et al. |
| 2014/0271292 | A1 | 9/2014 | Rowe et al. |
| 2021/0199001 | A1 | 7/2021 | Schaupp et al. |
| 2022/0176422 | A1* | 6/2022 | Quigley .................. B09B 1/006 |
| 2022/0326407 | A1* | 10/2022 | Littleford ................. G01V 3/38 |

FOREIGN PATENT DOCUMENTS

| | | |
|---|---|---|
| DE | 29519030 U1 | 3/1997 |
| GB | 639477 A | 6/1950 |
| JP | 2002214019 A | 7/2002 |
| JP | 2004055983 A | 2/2004 |
| RU | 2010137040 A | 3/2012 |
| WO | 2014102537 A1 | 7/2014 |

OTHER PUBLICATIONS

International Preliminary Report on Patentability for PCT Application Serial No. PCT/US2019/013829, dated Jul. 21, 2020, 6 pages.
International Search Report and Written Opinion from PCT Application Serial No. PCT/US2019/013829, dated May 7, 2019, 8 pages.
Office Action from Canadian Patent Application No. 3,087,281, dated Aug. 9, 2022, 4 pages.
First Office Action from Chinese Application No. 201980008624.9, dated Feb. 9, 2023, 12 pages.

* cited by examiner

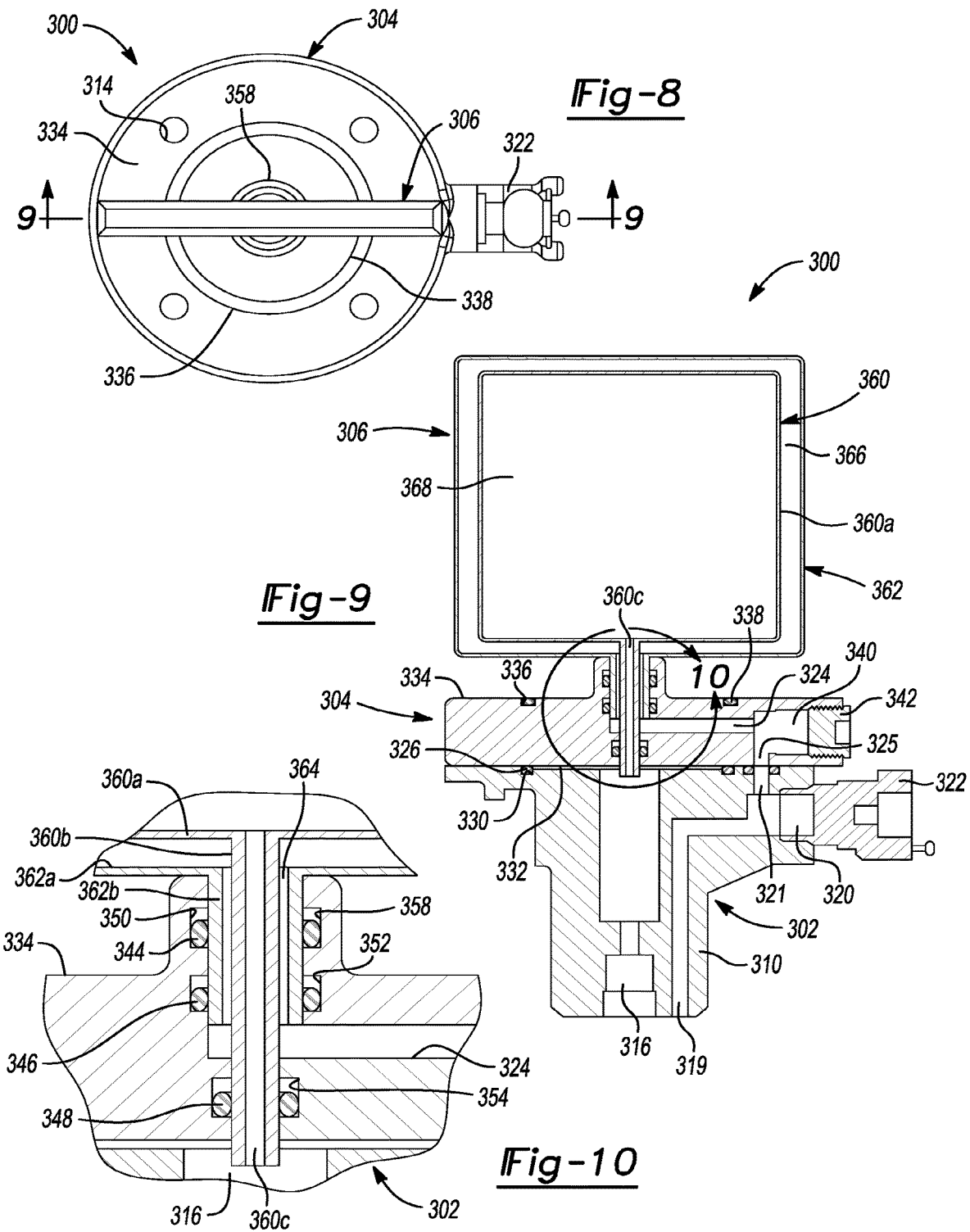

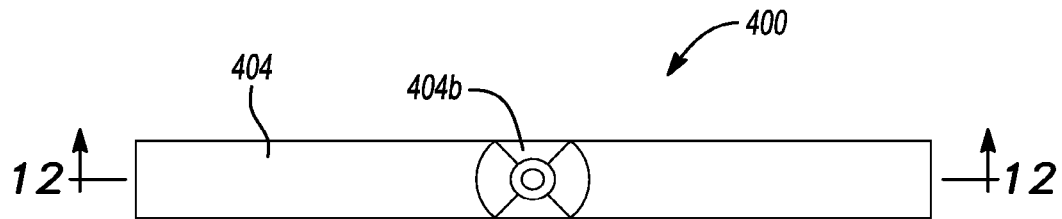
_Fig-11_
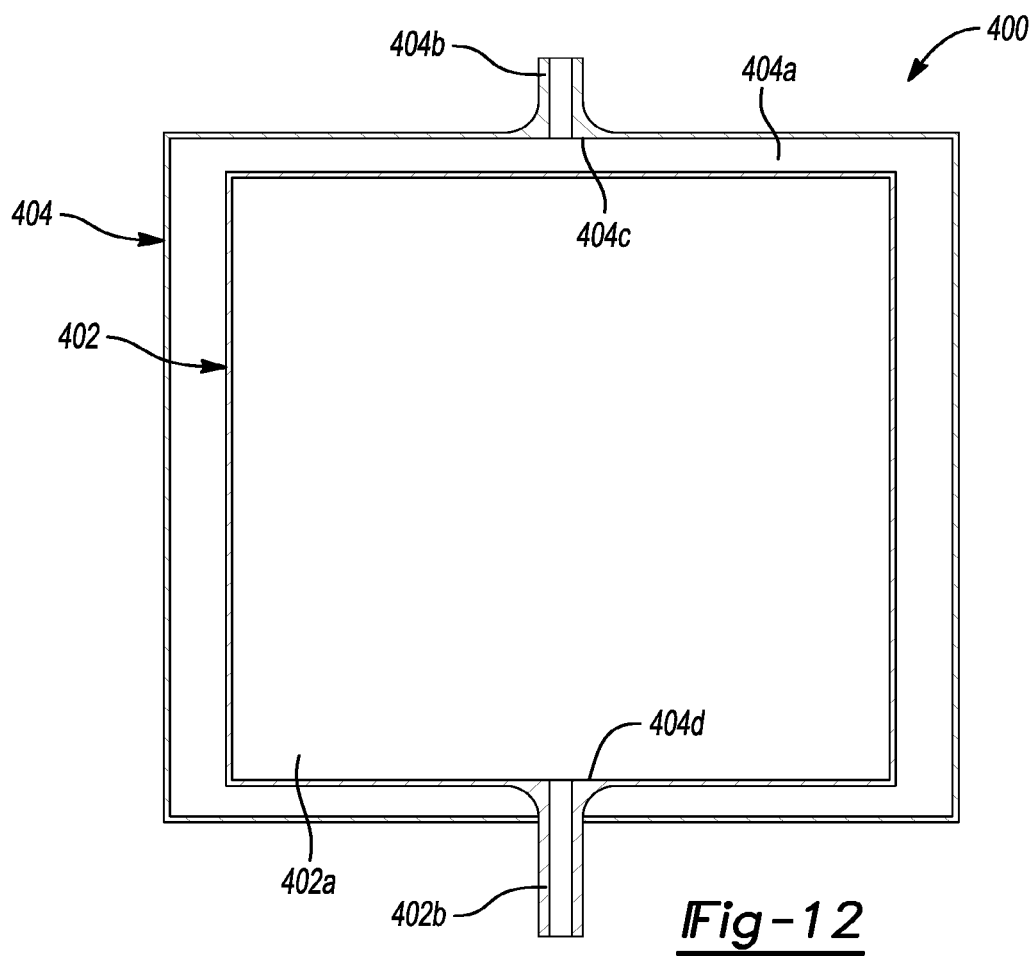
_Fig-12_

FLUID LEVEL MONITORING SYSTEM AND METHOD INCORPORATING PRESSURE SENSOR SYSTEM HAVING INFLATABLE/COLLAPSIBLE BAG

CROSS-REFERENCE TO RELATED APPLICATION(S)

This application is a continuation of U.S. application Ser. No. 16/962,662, filed Jul. 16, 2020, which is a U.S. National Stage Application of PCT Application No. PCT/US2019/013829, filed Jan. 16, 2019, which claims the benefit of U.S. Provisional Application No. 62/699,919, filed on Jul. 18, 2018 and U.S. Provisional Application No. 62/617,881, filed on Jan. 16, 2018. The entire disclosures of each of the above applications are incorporated herein by reference.

FIELD

The present disclosure relates to fluid level monitoring systems, and more particularly to a fluid level monitoring system and method used to sense pressure in a wellbore, and more particularly to a system and method that incorporates an inflatable and collapsible bag as a portion of a pressure sensing subsystem.

BACKGROUND

The statements in this section merely provide background information related to the present disclosure and may not constitute prior art.

In a landfill wellbore, an exposed, screened wall is often used in the wellbore. The screened wall allows gas that migrates into the wellbore to pass through the openings in the screened wall and into the wellbore. The gas may then be extracted and pumped to a surface located reservoir or collection system.

It will be appreciated that in a typical landfill well there are a variety of chemicals, and such chemicals may be either in a gas form or in a liquid form. Liquids typically also migrate into the wellbore and the level of such liquid needs to be maintained at a level which allows extraction of the gas that migrates into the wellbore. Once extracted, the gas collected from the wellbore may be commercially sold.

In order to optimize the collection of collection of gas from a wellbore, it is desirable to know and control the amount of liquid collecting within the wellbore. One device that has proven valuable in monitoring a fluid level within a wellbore is the "EZ Level" device available from the assignee of the present disclosure. That device captures a bubble which causes a bellows to expand (and extend), which moves an indicator element when the fluid in the well is above a predetermined point. While effective, this device nevertheless requires a bellows to physically change dimensions and physically move an indicator to produce a visual indication (an indicator that has moved) that a technician interprets to determine the fluid level.

One option which would not require a movable element to signify is a fluid level reading would be to simply place a pressure sensor within a chamber where the pressure sensor is exposed to gas in the well that flows into the chamber. The pressure sensor may respond to the gas within the chamber by generating an output signal (i.e., an output voltage or current) that is related to the sensed pressure within the chamber. However, pressure sensors of this type are typically highly sensitive to moisture, and any moisture present in the gas that makes direct contact with the pressure sensor could affect the longevity and/or accuracy of the pressure sensor.

Accordingly, there still exists a need for a system that is able to accurately and reliably sense a pressure of a fluid (e.g., gas or liquid) within a sensing chamber without requiring physical contact with the sensing element of a pressure sensor.

SUMMARY

This section provides a general summary of the disclosure, and is not a comprehensive disclosure of its full scope or all of its features.

In one aspect the present disclosure relates to a fluid level sensing system for sensing a fluid level in a well. The system may comprise an upper housing and a lower housing. The lower housing is in communication with the upper housing and includes a first bore. At least one of the upper and lower housings includes a second bore. The bores are isolated from one another and at least one is in communication with the fluid in the well, and the other is in communication with at least one of a vacuum gauge or an external vacuum source. The upper and lower housings cooperate to define an interior area which houses a first flexible bag and a second flexible bag, with the first flexible bag being housed within the second flexible bag. A portion of one of the first and second flexible bags communicates with the first bore and is responsive to a change in pressure within the first bore caused by a changing fluid level in the well. A portion of the other one of the first and second flexible bags is in communication with the second bore and is isolated from the first bore, and configured to exert a reference pressure on the one of the first and second flexible bags. A sensing subsystem may be included which is responsive to expanding and contracting movement of the first and second flexible bags, for generating a signal indicative of a change in a level of the fluid in the well.

In another aspect the present disclosure relates to a fluid level sensing system for sensing a fluid level in a well. The system may comprise an inlet housing having a first bore and a second bore extending therethrough, the first bore configured to communicate with fluid in the well, and the second bore configured to communicate with an ambient environment in the well to enable a controlled vacuum from an external vacuum source to be applied to the ambient environment within the well. A sealing plate may be included which is adapted to be secured to the inlet housing. The sealing plate may include first and second bores in communication with the first and second bores, respectively, of the inlet housing, when the sealing plate and the inlet housing are secured together. The system may further include an upper housing secured to the inlet housing, and a dual flexible bag assembly positioned within the upper housing. The dual flexible bag assembly may include first and second flexible bags, with the first flexible bag being housed within the second flexible bag such that only a single opening is formed in the second flexible bag. The first flexible bag may include an opening and be in communication with the first bore in the inlet housing, and isolated from the second bore in the inlet housing, and responsive to a change in pressure in the first bore of the inlet housing caused by a changing fluid level in the well. The second flexible bag may include an opening coaxially arranged with the opening in the first flexible bag, and be in communication with the second bore of the inlet housing, and isolated from the first bore of the inlet housing. The second flexible may is responsive to the controlled vacuum to cause the second flexible bag to act on the first flexible bag and to exert a compressive reference pressure on the first flexible bag as the first flexible bag expands and contracts in response to the changing fluid level in the well. A movable element may be included which is housed in the upper housing. The movable element is movable in response to expanding and contracting movement of the first and second flexible bags in response to the changing fluid level in the well. A sensor may be included which is responsive to movement of the movable element for providing a signal indicative of movement of the movable element, the signal being indicative of a fluid level within the well at a given time.

In still another aspect the present disclosure relates to a method for sensing a fluid level in a well. The method may comprise using a first flexible bag in communication with a fluid in the well to sense a change in pressure caused by a change in a level of the fluid within the well, wherein the change in pressure is experienced within an interior area of the first flexible bag. A second flexible bag may be used to encase the first flexible bag, and a vacuum force may be applied to the second flexible bag to exert a controlled compressive action on the first flexible bag. The method may further include using a sensing system responsive to expanding and contracting movement of the first and second flexible bags to determine when a fluid level within the well has changed.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 8 is a top view showing the coaxial bag assembly assembled onto the coaxial sealing plate and inlet housing (the inlet housing being hidden from view underneath the coaxial sealing plate);

FIG. 9 is a side cross sectional view of the assembly shown in FIG. 8 taken in accordance with section line 9-9 in FIG. 8;

FIG. 10 is an enlarged illustration of the are denoted by circle 10 in FIG. 9;

FIG. 11 is a top view of another embodiment of a dual vacuum bag assembly in accordance with the present disclosure;

FIG. 12 is a cross-sectional side view of the assembly of FIG. 11 taken in accordance with section line 12-12 in FIG. 11;

DETAILED DESCRIPTION

Figure 1:
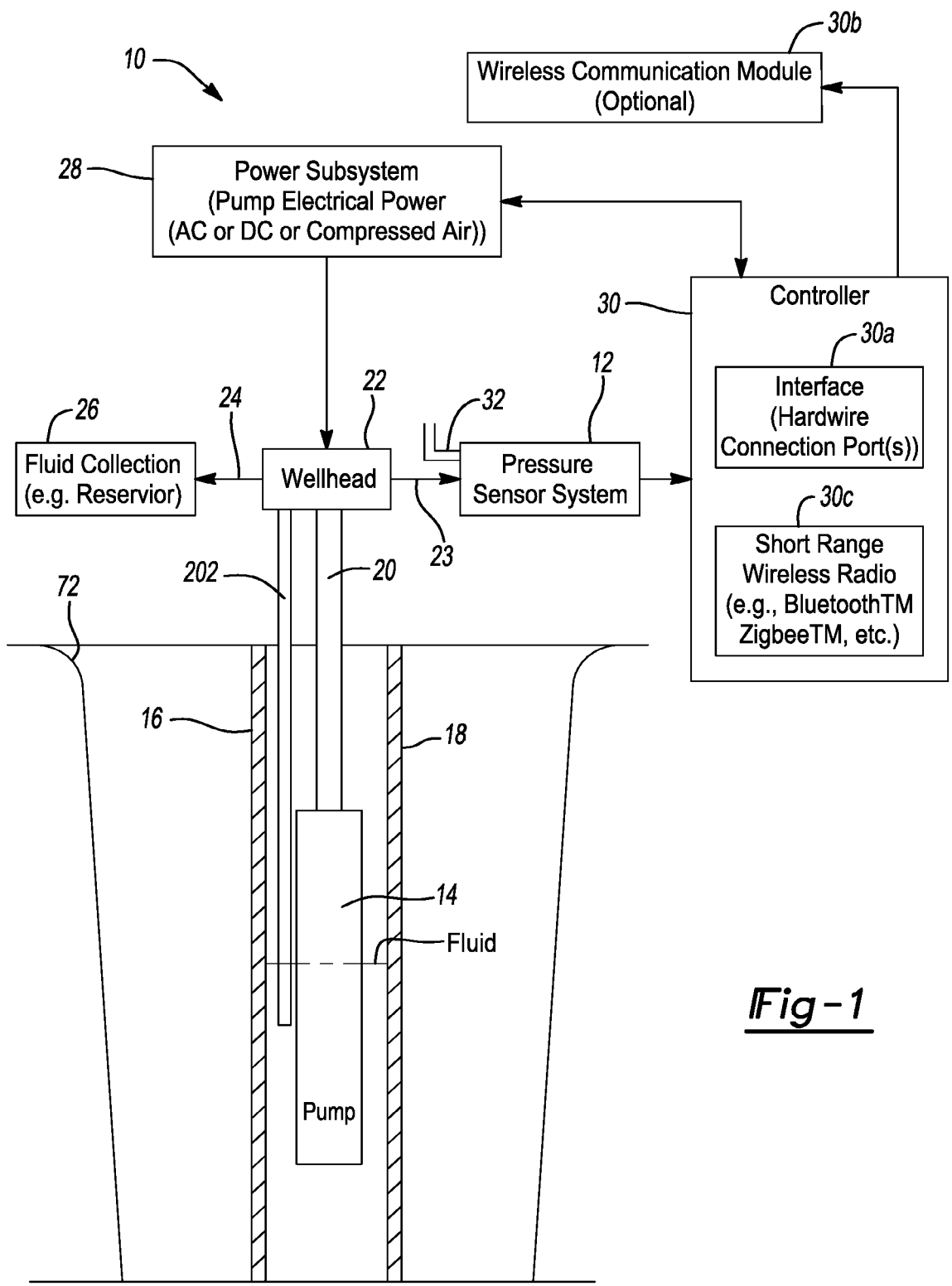
FIG. 1 is a high level diagram of a fluid pump positioned in a well bore, which is in communication with a pressure sensor of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1 a fluid level monitoring system 10 is shown which employs a pressure sensor system 12 in accordance with one embodiment of the present disclosure. In general, the system 10 may include a well pump 14 disposed in a well bore 16. A screen 18 may be installed in the wellbore 16 to facilitate the admittance of fluids (e.g., liquid or gas) into the wellbore.

A plurality of tubes 20 may be in communication with a wellhead 22 of the pump 14. The plurality of tubes 20 may include a conduit 23 for admitting fluid (e.g., gas or liquids) into the pressure sensor system 12. One of the plurality of tubes 20 may also include a conduit 24 for routing collected fluid to a collection reservoir 26. A power subsystem 28 may be used to provide power, for example either AC power, DC power or compressed air, for powering the pump 14. A controller 30 may be in communication with the pressure sensor system 12 to receive information from the system 12 and to use such information in further controlling the pump 14 or reporting current well water level. The controller 30 may include an interface 30a for enabling a hardwired connection (e.g., via a RS-232, USB or HDMI cable) with an external instrument, for example a laptop, computing tablet or possibly even a smartphone. Optionally, the controller 30 may be coupled to (or may integrally include) a wireless communication module 30b for communicating wirelessly with a cellular network or a local area network (LAN) within proximity of the module. Still further, the controller 30 may incorporate a short range wireless radio, for example a BLUETOOTH™ protocol wireless radio, a ZIGBEE™ protocol wireless radio, a LoRa protocol wireless radio, or any other suitable short range protocol radio, for communicating wirelessly with a user's personal electronic device (e.g., laptop, computing tablet, smartphone, etc.) which is in close proximity to the controller 30.

The pressure sensor system 12 may also incorporate a vent 32. The vent 32 may be used for venting an interior area of the pressure sensor system 12 to atmosphere, which will be described further in the following paragraphs.

Figure 2:
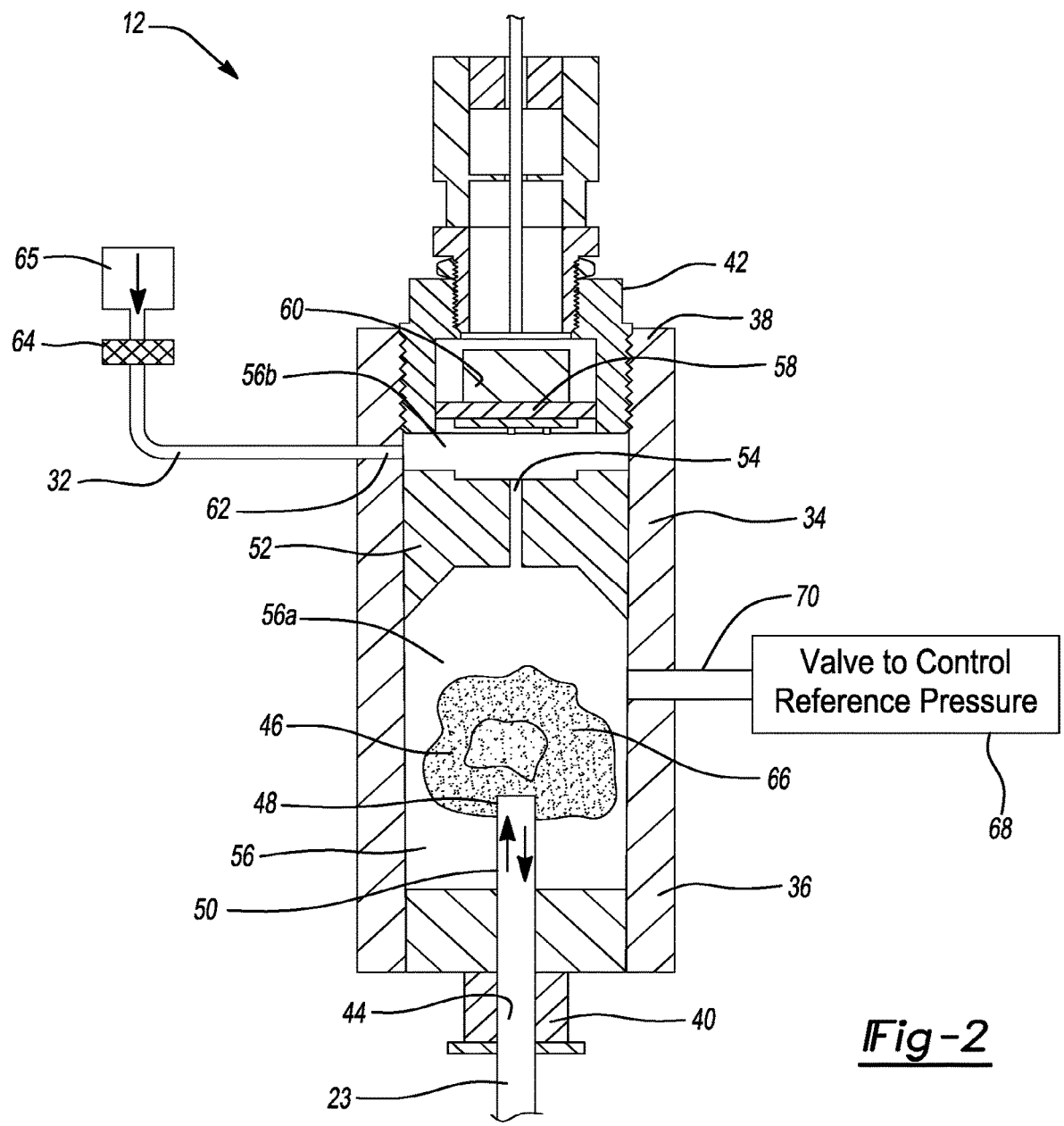
FIG. 2 is a high level cross sectional side view of the pressure sensor system of FIG. 1 illustrating in greater detail internal components within the system.

Referring to FIG. 2, the Pressure Sensor System 12 is shown in greater detail. The pressure sensor system 12 (hereinafter "PSS 12") may include a housing 34 having a threaded inlet end 36 and a threaded outlet end 38. The threaded inlet end 36 may receive a first threaded end cap 40, while the threaded outlet end 38 receives a second threaded end cap 42. The first threaded end cap may have a bore 44 which communicates with the conduit 23 to allow fluid (gas or liquid) to be admitted to the housing 34.

The housing 34 may house a flexible bag 46 having an opening 48 which is secured to a section of conduit 50 at one end. An opposite end of the section of conduit 50 is also secured to the first threaded end cap 40, or alternatively may be formed as an integral portion of the first threaded end cap. In either event, the section of conduit 50 enables fluid (e.g., well gas or gas) to be conducted from conduit 23 into the flexible bag 46.

An interior area 56 of the housing 34 may include a wall portion 52 having an orifice 54 formed therein which forms a reduced diameter flow path through the wall portion 52. The wall portion 52 otherwise separates the interior area 56 of the housing 34 into a first (or lower) section 56a and a second (or upper) section 56b. This is a controlled volume to limit the expansion of the flexible bag 46 to a volume less than the volume of the flexible bag. This protects the flexible bag 46 from over expansion which could lead to a rupture. A rupture of the flexible bag 46 would cause a sensor failure due to the gas qualities that the sensor would then be exposed to.

The second (upper) section 56b of the housing 34 communicates with a pressure sensing component 58 which is housed in a recess 60 of the second threaded end cap. The housing 34 also includes a port 62 which is in communication with the vent 32 (FIG. 1). Vent 32 allows the second section 56b to communicate with the ambient atmosphere, preferably through a vapor barrier 64. A vent valve 65 may also be included for allowing selective control over the venting of the second section 56b. The venting can be controlled to open periodically or just one time when the PSS 12 is first assembled. The venting provides local atmospheric reference pressure.

The pressure sensing component 58, in one form, is a pressure sensor commercially available from Robert Bosch GmbH as part no. BMP-280. However, it will be appreciated that any other suitable pressure sensor may be incorporated into the PSS 12.

The section of conduit 50 may be formed from any suitable material, for example plastic, stainless steel, etc. The flexible bag 46 may likewise be formed from plastic or any other suitable material, for example Polyethylene, which is flexible and able to be inflated by either a gas or a liquid. The attachment of the section of conduit 50 to the flexible bag 46 may be by adhesives, by plastic welding, or by any other suitable means of attachment that creates a fluid tight seal at the attachment point of the conduit 50 and flexible bag 46.

During operation of the pump 14 shown in FIG. 1, fluid (e.g., well gas) is collected within the pump 14 and may flow up through one of the plurality of tubes 20 and into the conduit 23. From conduit 23 the fluid (e.g., well gas or gas) may flow through the bore 44 in the first threaded end cap 40, through the section of conduit 50, through the opening 48 in the flexible bag 46 and into an interior area 66 of the flexible bag to be captured therein. As fluid (e.g., well gas or gas) collects in the interior area 66 of the flexible bag 46 this causes the flexible bag 46 to expand. This expansion forces air present within the first (e.g., lower) section 56a of the interior area 56 of the housing 34 to be displaced through the orifice 54 into the second (e.g., upper) section 56b of the housing 34. This airflow acts on the pressure sensing component 58, which generates an electrical signal (e.g., voltage or current) that is output to the controller 30. From this output signal the controller 30 is able to monitor a pressure of the fluid within the housing 34 of the PSS 12.

When the pressure within the pump 14 begins to subside, the flexible bag 46 will begin to collapse. This relieves the pressure within the second section 56b of the housing 34 causing a corresponding change in the output signal generated by the pressure sensing component 58. This change in the signal from the pressure sensing component 58 is detected by the controller 30. Accordingly, as the flexible bag 46 expands and contracts, pressure within the housing 34 (and thus within the pump 14) can be monitored by the controller 30 in real time. The controller 30 may use this information to control operation of the pump 14 in real time, for example by controlling the power subsystem 28 (FIG. 1) as needed to cycle the pump to maintain a desired pressure level within the pump 14. In this manner the collection of fluid (e.g., gas) from the pump 14 may be optimized.

It is important to note that the since the flexible bag 46 is constrained within the housing 34, which itself forms a rigid structure, the air displaced from the second section 56b of the housing as the flexible bag expands and collapses will consistently indicate the pressure within the housing 34 of the PSS 12, which can be reliably sensed by the pressure sensing component 58. The flexible bag 46 is allowed to expand in the housing 34 preferably only up to the limit of maximum pressure which the pressure sensing component 58 can read. This limit can be affected by tailoring the volume of the flexible bag 46 along with the volume of the first housing section 56a. This protects the pressure sensing component 58 from over pressurization all the while the pressure in the flexible bag 46 has exceeded the pressure sensing component's 58 maximum pressure rating. This safety limit is a physical size limitation inside the pressure vessel. Thus, while the pressure inside the flexible bag 46 could potentially far exceed the maximum pressure that the pressure sensing component 58 can be exposed to, the flexible bag itself cannot over-expand due to the selected size (i.e., volume) of the first housing section 56a, and the physical strength that the first housing section has as a result of its construction.

An important benefit of the PSS 12 is that the flexible bag 46 protects the pressure sensing component 58 from the gas being sampled. This is important because pressure sensors, such as the pressure sensor available from Robert Bosch GmbH referenced above, are very sensitive to moisture. The PSS 12 thus eliminates the concern about moisture reaching and contacting the pressure sensing component 58.

A particular advantage of the PSS 12 is that it can be used to measure an actual fluid depth within a wellbore, sump, tank or any other form of reservoir where fluid is collecting. The PSS 12 will monitor and update the fluid depth in real time as fluid conditions change. It is expected that the PSS 12 may be used to measure as much as, or possible more than, 24 inches of water column.

In another embodiment, as indicated also in FIG. 2, the PSS 12 may be modified to incorporate a valve 68 which can be used to open and close a pneumatic pathway 70 to the first section 56a of the housing 34. The valve and pneumatic pathway 70 maybe used to control a reference pressure within the first section 56a of the housing 34 which the flexible bag 46 is expanding/collapsing in. This reference pressure can be connected to the well gas stream. The arrangement allows for even more accurate pressure reading for the pressure sensing component 58. The porting gas may have moisture removed using a simple membrane (not shown).

Figure 3:
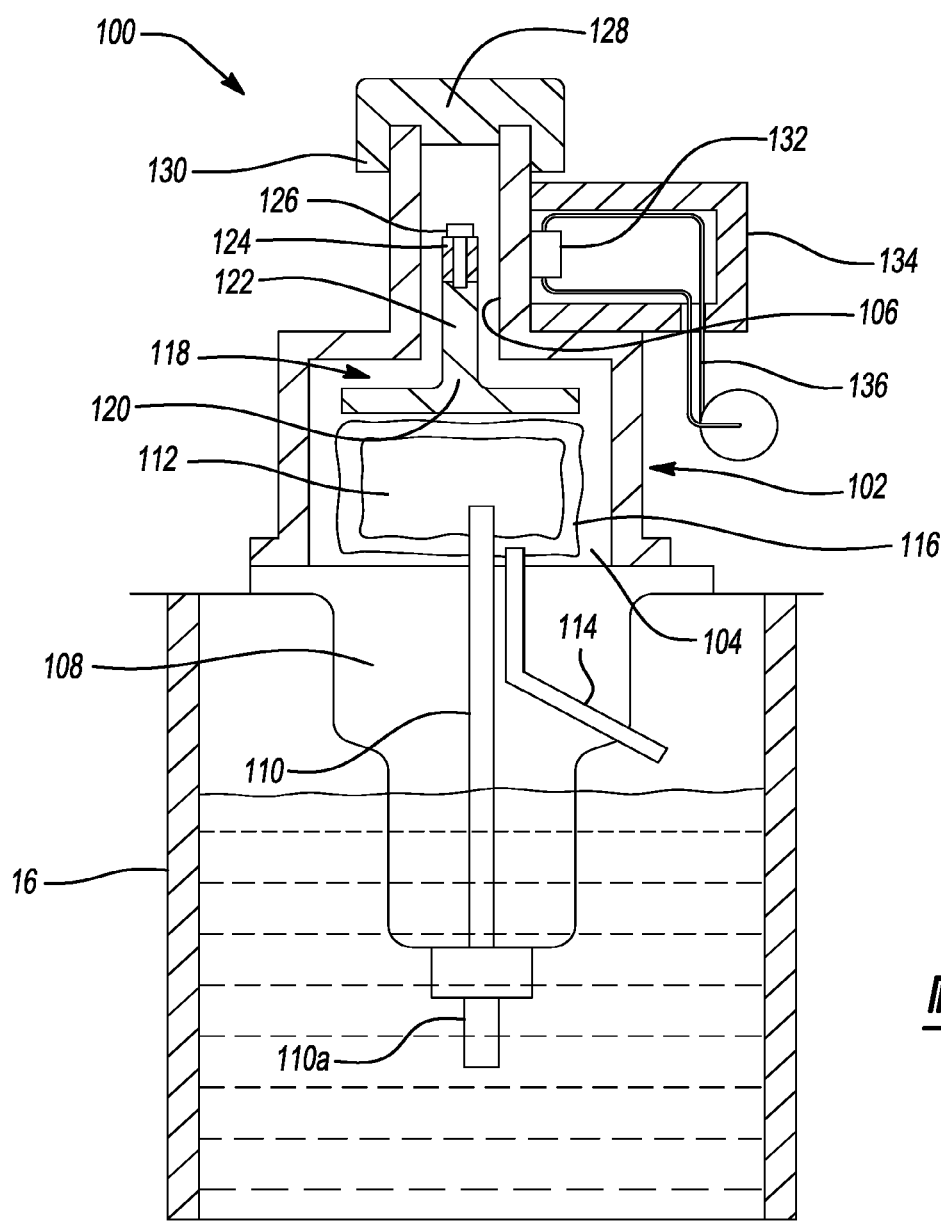
FIG. 3 is a high level cross sectional side view of another embodiment of a pressure sensor system in accordance with the present disclosure.

Referring to FIG. 3, a pressure sensor system 100 in accordance with still another embodiment of the present disclosure is shown. In this example the system 100 does not require the use of a discrete pressure sensing component. The system 100 may include an upper housing 102 having a first portion 104 and a second portion 106 of smaller diameter/area than the first portion. A body portion 108 is coupled to the upper housing 102. The body portion 108 includes a first axial bore 110 extending axially therethrough into communication with an interior area of an inner flexible bag 112. A second axial bore 114 is in communication with an interior area of an outer flexible bag 116. The inner flexible bag 112 is fully enclosed in the outer flexible bag 116. The first axial bore 110 is in communication with a tube or conduit 110a which extends into the fluid (e.g., liquid) in the well bore 16, and the second axial bore 114 is in communication with gas present within the well bore.

Within the first portion 104 of the upper housing 102 is a movable element which may resemble a piston 118 having a piston head 120 and a neck 122. The neck 122 carries a permanent magnet 124 affixed thereto, for example, by a threaded screw 126 extending through a bore in the magnet 124 and into a threaded blind hole (not visible in FIG. 3) in the neck 122. A cap 128 covers the second portion 106 but may still provide a vent 130 to the ambient atmosphere. While not shown in FIG. 3, vent 130 may optionally be coupled to a vapor barrier and a vent valve, such as components 64 and 65 shown in FIG. 2. A reed switch 132 may be positioned adjacent the magnet 124 and enclosed within a reed switch cover 134. A pair of conductors 136 may be coupled to an output of the reed switch 132 to receive electrical signals from the reed switch.

In operation as fluid within the wellbore 16 rises and forces air upwardly through the conduit 110a, the first axial bore 110 and into the inner flexible bag 112, the inner flexible bag expands. However, gas within the well bore 16 may also flow upwardly through the second axial bore 114 into the outer flexible bag 116 and begin to inflate the outer flexible bag. This acts as a counter "reference" or offsetting force to enable the flexible inner and outer flexible bags 112/116 to provide a pressure differential signal. This pressure differential signal is sensed by the reed switch 132 as the outer flexible bag 116 acts on the head 120 of the piston 118 causing it to rise or fall. In effect the inner flexible bag 112 is filled with a volume of air which is being displaced by the well fluid (e.g., well water) in the conduit 110a positioned in the fluid (e.g., well water) in the wellbore or reservoir. As the fluid level continues to rise in the wellbore or reservoir, a larger amount of air is displaced and pressurizes the inner flexible bag 112. The inner flexible bag 112 expands against the vacuum inside the outer flexible bag 116, and then the outer flexible bag 116 contacts the head 120 of the piston 118. As the piston 118 then rises, this moves the magnet 124 away from its proximity to the reed switch 132, and the reed switch senses a loss of the flux field provided by the magnet and generates a signal in accordance with this condition (e.g., a logic "0" level signal) which is transmitted on conductor 136. Once the piston 118 drops back down to the point where the magnet 124 is closely adjacent to the reed switch 132, the flux field is again sensed by the reed switch 132 and it outputs a signal on conductor 136 indicative of this condition (e.g., a logic "1" level signal). The output signals from the reed switch 132 may be used by a controller (e.g., controller 30 in FIG. 1) in interpreting the fluid level with the well. This embodiment thus provides the benefit of a low electrical energy water level sensor which is ideal for remote applications, and particularly applications where remote fluid level monitoring is being conducted using the Internet.

Another embodiment of the present disclosure may use the pressure sensor system 12 or the system to directly measure a fluid level with a tank or reservoir 72, as indicated in FIG. 1. This embodiment may make use of the pump 14, or the pump may be omitted. If the pump 14 is omitted, then a tube may be coupled to a sidewall of the reservoir 72 (e.g., a sidewall of a tank) or other fluid collecting structure, or possibly directly to an input of the pressure sensor system 12 (or to pressure sensor 100), for example directly to the body portion 108 (FIG. 3). This embodiment also provides the benefit of being able to sense a fluid level within a reservoir, tank, container, etc., without requiring physical contact between the fluid being sensed and a pressure sensing component. For an implementation involving a fluid collection tank, reservoir, pond or other fluid containing structure/system, the controls may be remotely or directly connected to the structure rather than to a wellhead.

The direct measurement of fluid in the wellbore 16 or in the reservoir 72 can be measured up to the limit of the pressure transducer being used. For example, the pressure sensing component 58 referenced herein, available from Robert Bosch GmbH, can read up to 34 inches of water column.

Figure 4:
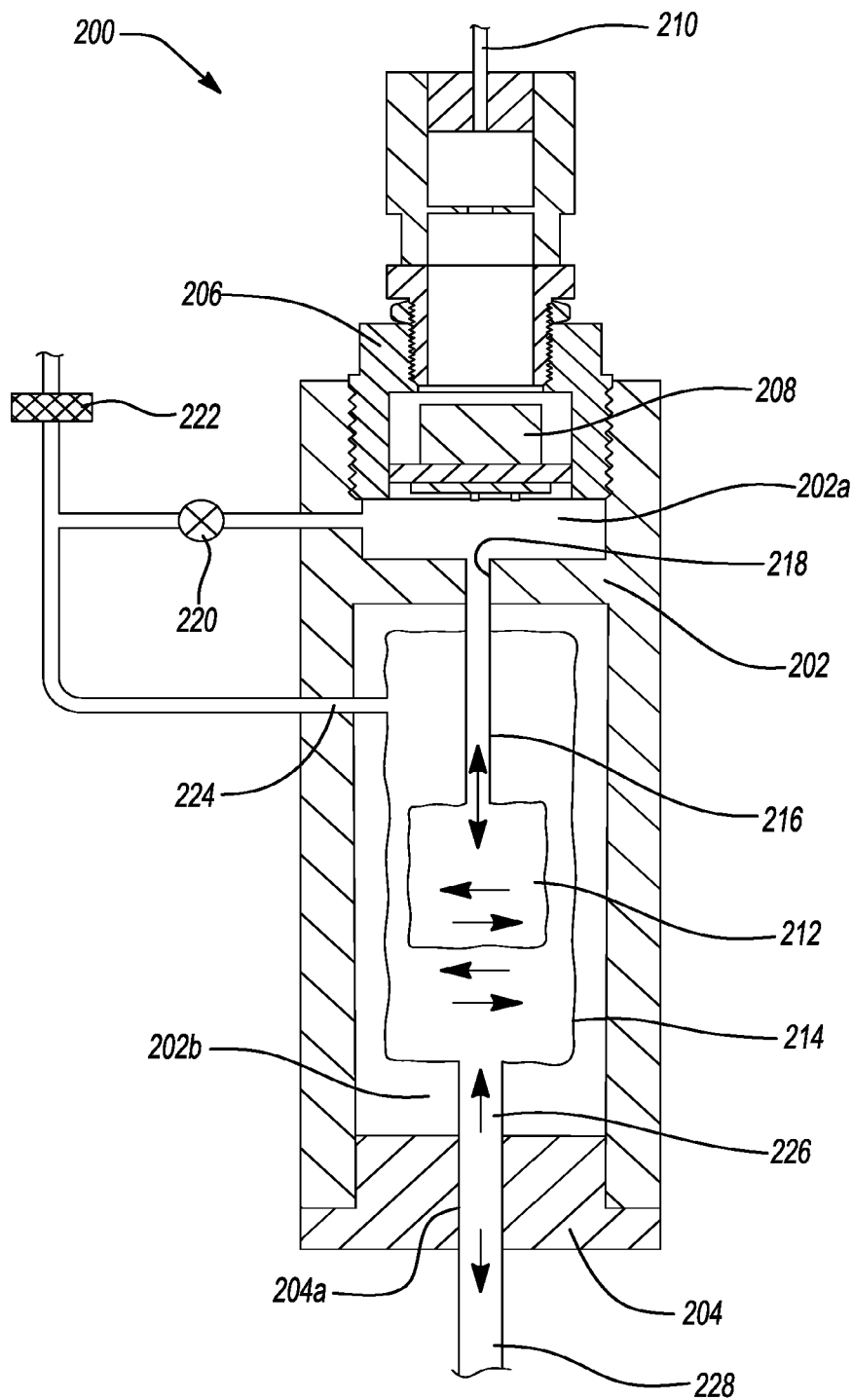
FIG. 4 is a high level cross sectional side view of another embodiment of the pressure sensor system in accordance with the present disclosure which an inner flexible bag is used to generate a positive pressure, and an outer flexible bag receives a vacuum from the well gas to enable the outer flexible bag to act on the inner flexible bag, and the resulting pressure change experienced by the inner flexible bag is sensed by a pressure sensing component.

FIG. 4 shows a system 200 in accordance with another embodiment of the present disclosure for even more precisely sensing a fluid level in a well via a pressure sensing system. System 200 includes a housing 202 having a first threaded end cap 204 secured at a first end of the housing, and a second end cap 206 containing the pressure sensing component 208 secured at the opposite end of the housing. The pressure sensing component may likewise be the sensor component available from Robert Bosch GmbH referenced herein, or any other suitable pressure sensor. An electrical conductor associated with the pressure sensor component 208 may be coupled to the controller 30 (FIG. 1). The housing 202 may include an inner flexible bag 212 disposed within an outer flexible bag 214. The inner flexible bag 212 may be coupled via a tubular section 216 secured thereto to a port 218 in communication with an upper section 202a of the housing 202. The tubular section 216 isolates the inner flexible bag 212 from the outer flexible bag 214. The upper section 202a may be vented to atmosphere by way of a vent valve 220 and a vapor barrier 222. During assembly of the system 200 the vent valve 220 may be opened and then closed after assembly is complete.

The housing may include a lower section 202b in which the two flexible bags 212 and 214 are located. The lower section 202b may also be vented to atmosphere through a port 224 which communicates with the ambient atmosphere directly or optionally through the vapor barrier 222. The first threaded end cap 204 includes an axial bore 204a that communicates with the interior area of the outer flexible bag 214 via a short length of tubing 226. A longer length of tubing or conduit 228 extends into communication with a well gas vacuum.

As the well vacuum applied to conduit 228 increases, the outer flexible bag 214 collapses onto the inner flexible bag 212. This collapsing changes the internal pressure within the lower housing section 202b. Thus, as the vacuum changes, the internal pressure within the lower housing section 202b changes. The lower housing section 202b is in communication with the ambient atmosphere which allows for corrected vacuum readings. This feature may be important for accounting for the elevation where the system 200 is being used, as well as accounting for weather changes. In essence, the vacuum present within the outer flexible bag 214 acts on the inner flexible bag 212, and this change in pressure experienced by the inner flexible bag 212 can be sensed by the pressure sensor component 208.

In still another embodiment, a temperature sensor may be incorporated and used to compensate for temperature changes in the fluid being sensed which may otherwise influence the pressure being sensed by the pressure sensing component 58.

Still another embodiment may make use of a second pressure transducer to compensate for ambient pressure change effects. The second pressure transducer may be connected to the same controller (e.g., controller 30). The local atmospheric pressure data will be communicated and software running on the controller may receive this variable and be used to correct the output from the application sensor.

Figure 5:
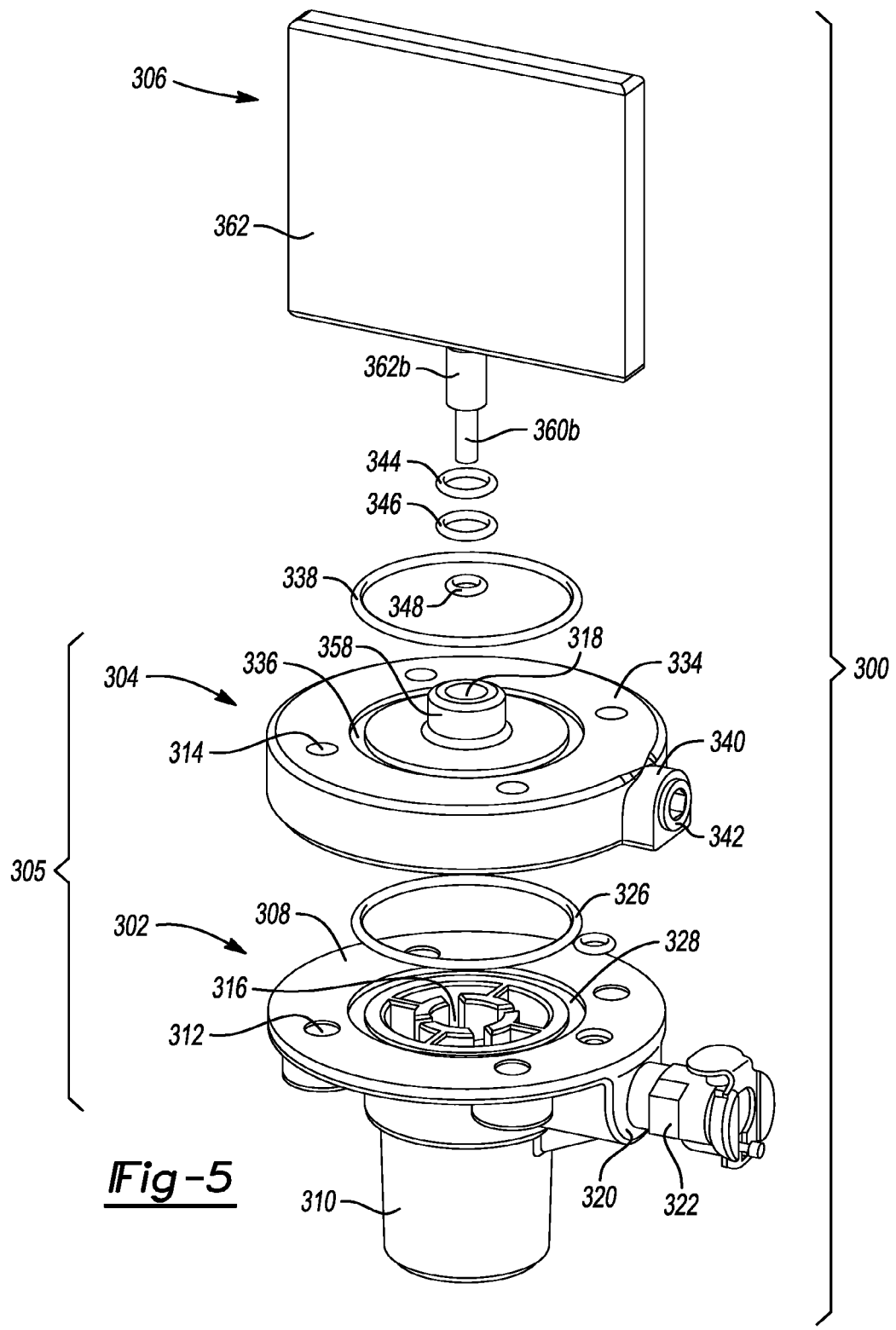
FIG. 5 is an exploded perspective view of another embodiment of an inlet housing, coaxial sealing plate and a coaxial bag assembly.
Figure 6:
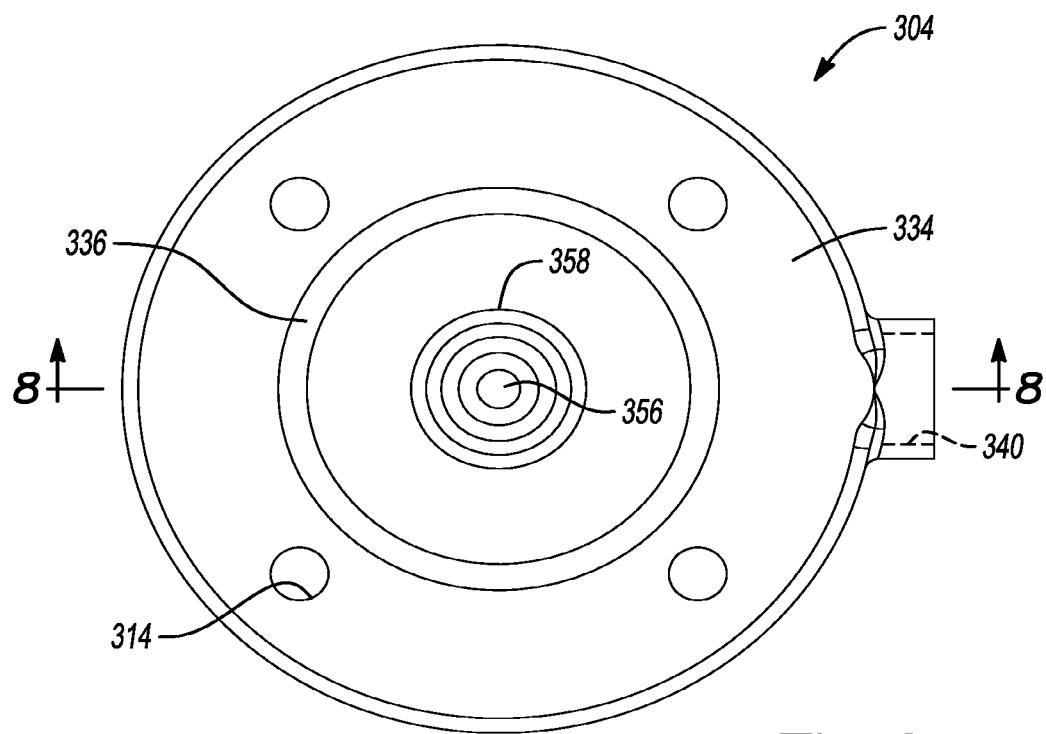
FIG. 6 is a top view of the coaxial sealing plate.
Figure 7:
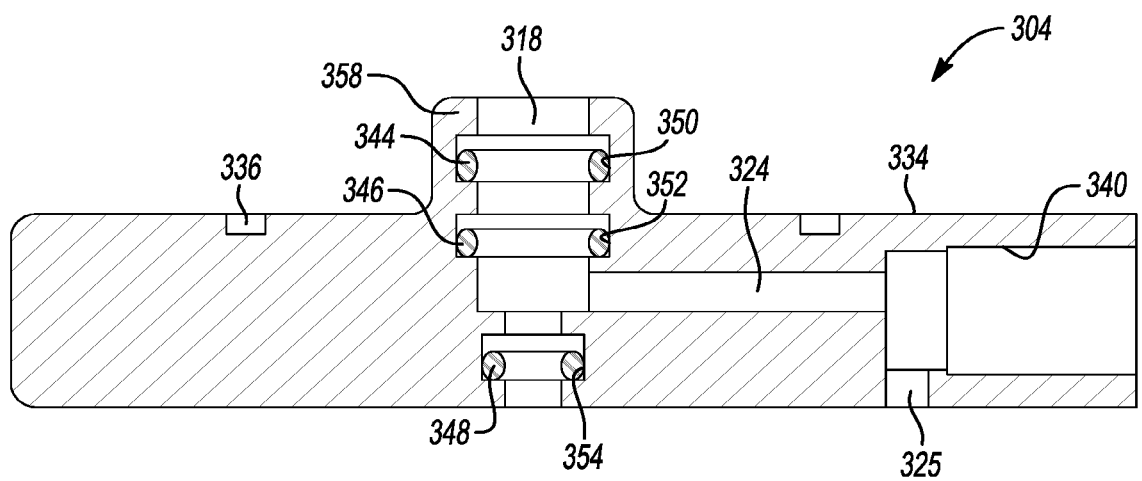
FIG. 7 is a side cross sectional view taken along section line 7-7 in FIG. 6 of the coaxial sealing plate showing the interior passageways formed therein for communicating with each of the two bags of the coaxial bag assembly shown in FIG. 5.

Referring now to FIG. 5, a pressure sensor system 300 (hereinafter "PSS 300") is shown in accordance with another embodiment of the system 10 (the sensing component 208 and the housing 202 have been omitted for clarity). The PSS 300 in this example may also be used to move an element, for example piston 118 in FIG. 3, the movement of which can be sensed using an attached magnet and flux sensing component, such as the permanent magnet 124 and reed switch 132, in the same manner as discussed in connection with the system 100 of FIG. 3.

The PSS 300 may include an inlet housing 302, a coaxial sealing plate 304 and a coaxial dual vacuum bag assembly 306 (hereinafter "vacuum bag assembly 306"). The inlet housing 302 and the coaxial sealing plate 304 may form a multi-part lower housing assembly 305. The inlet housing 302 includes a base portion 308 and an integrally formed threaded neck portion 310. The threaded neck portion 310 may be connected to a threaded bore on a conventional wellhead assembly, for example threaded inlet 40 shown in FIG. 2. Threaded holes 312 are aligned with holes 314 in the coaxial sealing plate 304 to enable threaded fasteners (not shown) to be used to secure components 302 and 304 together.

The inlet housing 302 also includes an axial bore 316 extending therethrough which is axially aligned with a stepped central bore 318 in the coaxial sealing plate 304. With brief reference to FIG. 9, the inlet housing 302 can further be seen to include a secondary bore 319 which communicates with a port 320. The port 320 is closed off using an access fitting 322, which may be one of the "quick connect" types that allow a mating quick connector to be quickly coupled thereto so that the port 320 can be interfaced to a vacuum gauge (not shown). The port 320 communicates through a radial flow passage 324 with the bag assembly 306, which will be described in greater detail in the following paragraphs.

With further reference to FIGS. 5, 9 and 10, an O-ring 326 may be seated in a groove 328 in the base portion 308 of the inlet housing 302. The O-ring 326 also seats against an undersurface 330 (FIG. 9) of the coaxial sealing plate 304 and helps to seal off the axial bore 316.

With reference to FIGS. 6-9, an upper surface 334 of the coaxial sealing plate 304 includes a similar groove 336 in which another O-ring 338 may be disposed. O-ring 338 may be used to help seal an external upper housing (similar or identical to the upper housing 102 shown in FIG. 3) to the coaxial sealing plate 304 to form a volume in which bag assembly 306 is housed. The coaxial sealing plate 304 further includes a threaded bore 340 (FIG. 9) which is sealed with a threaded screw 342, to close off the flow passageway 324 from the ambient environment, and also to provide a location to mount the sensing component 208 (shown in FIG. 4).

As shown in FIGS. 5, 7, 9 and 10, a plurality of O-rings 344, 346 and 348 may be included which are positioned in coaxially arranged grooves 350, 352 and 354, respectively, around the stepped axial bore 318. The stepped axial bore 318 opens in a neck portion 358 of the coaxial sealing plate 304 and also communicates with the radial flow passage 324. The O-rings 344, 346 and 348 help to seal the bag assembly 306 as will be described in the following paragraphs.

With brief reference to FIG. 9, it can be seen that the inlet housing has a bore 321 in communication with the port 320. The coaxial sealing plate 304 also has a bore 325 in communication with the radial flow path 324 and the bore 340. The bores 321 and 325 help to form an uninterrupted flow path through the inlet housing 302 and the coaxial sealing plate 304 when these two components are coupled together.

With further reference to FIGS. 5, 9 and 10, the bag assembly 306 can be seen in greater detail. The bag assembly 306 in this example comprises a unique construction in which an inner flexible bag 360 is arranged within an outer flexible bag 362. The inner flexible bag 360 includes a main portion 360a and a neck portion 360b. The neck portion 360b may be formed using a separate length of tubing, for example plastic or metallic tubing, which is secured such as by bonding or any other suitable construction, to the main portion 360a. Alternatively, the neck portion 360b may be an integrally formed portion of the main portion 360a; both construction arrangements are contemplated by the present disclosure. The outer flexible bag 362 similarly includes a main portion 362a and a neck portion 362b which may likewise be a short length of metallic or plastic tubing secured to the main portion 362a by adhesives or via any other suitable construction technique. Optionally, the neck portion 362a may likewise be formed as an integral portion of the main portion 362a. Importantly, the neck portions are dimensioned such that the neck portion 360b fits within the neck portion 362b and provides a small clearance therebetween to form a flow path 364 which communicates with the radial flow path 324. In this manner a vacuum flow through the flow paths 324 and 364 can be communicated to an interior area 366 of the outer flexible bag 362.

The inner flexible bag 360 as well as the outer flexible bag 362 may each be made from low density polyethylene, possibly from rubber or any other suitable materials. Optionally, one or both of the flexible bags 360 and/or 362 may be made from foil, which is non-permeable to gas or liquid transferring from one flexible bag 360 or 362 to the other. The inner and outer flexible bags 360 and 362 need not be made from the same materials; instead they could be constructed from different materials to provide different operational characteristics or to best meet the needs of a specific application. A foil material may also offer a larger operating window for temperature.

Referring further to FIGS. 9 and 10, an interior area 368 of the inner flexible bag 360 communicates through a bore 360c formed in the neck portion 360b with the axial bore 316 of the inlet housing 302. In this manner, air displaced upwardly within the axial bore 316 as the wellbore fills with fluid may be communicated into the interior area 368 of the main portion 360a of the inner flexible bag 360.

As noted in FIG. 10, the O-rings 344 and 346 provide a seal between the neck portion 362b and an inner wall surface 370 of the stepped axial bore 358 in the neck portion 358 so that no fluid is able to leak out through this area, and the fluid flowing through the radial flow path 324 is forced to flow into the interior area 366 of the outer flexible bag 362. Similarly, the O-ring 348 provides a seal between an outer surface of the neck portion 360b and an inner surface portion 372 of the stepped axial bore 318 so that no fluid displaced upwardly in the axial bore 316 of the inlet housing 302 is able to pass into the radial flow path 324 and then into the interior area 366 of the main portion 362a of the outer flexible bag 362. Therefore, any air displaced upwardly in the axial bore 316 is forced to flow into the bore 360c of the neck portion 360b of the inner flexible bag 360, and then into the interior area 368 of the inner flexible bag. This construction is highly advantageous as it eliminates the need to form two separate flow paths through the coaxial sealing plate 304. It also eliminates the need to form two separate openings in the outer flexible bag 362, which would otherwise be needed to allow the neck portion 360b of the inner flexible bag 360 to project therethrough, and a separate opening and associated neck portion to allow fluid to flow into the outer flexible bag 362. Arranging the two neck portions 360b and 362b in a coaxial manner, which requires only one opening in the outer flexible bag 362, significantly enhances the ease of construction of the bag assembly 304, as well as reduces the possibility of air leaking into the outer flexible bag 362, which would be greater with two separate openings being present in the outer flexible bag.

The bag assembly 306 otherwise operates identically to the inner flexible bag 112 and outer flexible bag 116 discussed in connection with FIG. 3. Providing the outer flexible bag 362 enables a controlled vacuum to be applied to form a reference in measuring the pressure exerted when the inner flexible bag 360 expands in rising to rising fluid within the wellbore, and causes the outer flexible bag to exert pressure on a pressure sensor (e.g., pressure sensor 120 shown in FIG. 3).

With brief reference to FIGS. 11 and 12, a dual vacuum bag assembly 400 is shown in accordance with another embodiment of the present disclosure. The bag assembly 400 in this example includes a flexible inner bag 402 and a flexible outer bag 404. The bag assembly 400 may otherwise be constructed similar to the bag assembly 306, but the difference here is that the flexible outer bag 404 includes a main portion 404a with a neck portion 404b, and the inner flexible bag 402 includes a main portion 402a and a neck portion 402b, where the neck portion 404b extends in an orientation 180 degrees from the neck portion 402b. This construction necessitates two separate openings in the outer flexible bag 404: one opening 404c in communication with the neck portion 404b and the other forming an opening 404d which enables the neck portion 402b to pass through the outer flexible bag 404. The interface between the openings 404c and the neck portion 404b, as well as the interface between the opening 404d, need to be air tight interfaces so that no leakage can occur with respect to the outer flexible bag 404. This configuration of arranging the neck portions 402b and 404b to extend in opposing directions may be needed or helpful in some applications, depending on the specific construction of the inlet housing 302 that is chosen.

Figure 13:
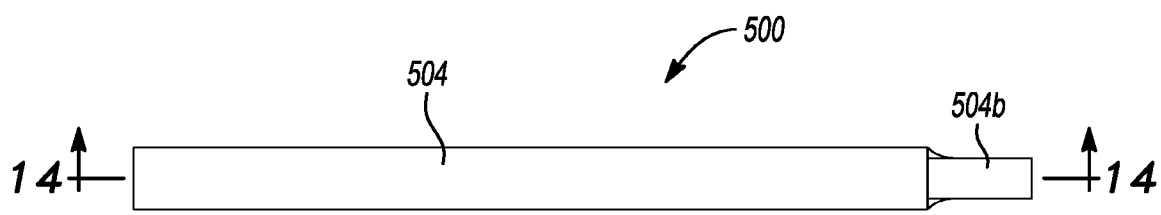
FIG. 13 is a top view of another embodiment of the dual vacuum bag assembly of the present disclosure.
Figure 14:
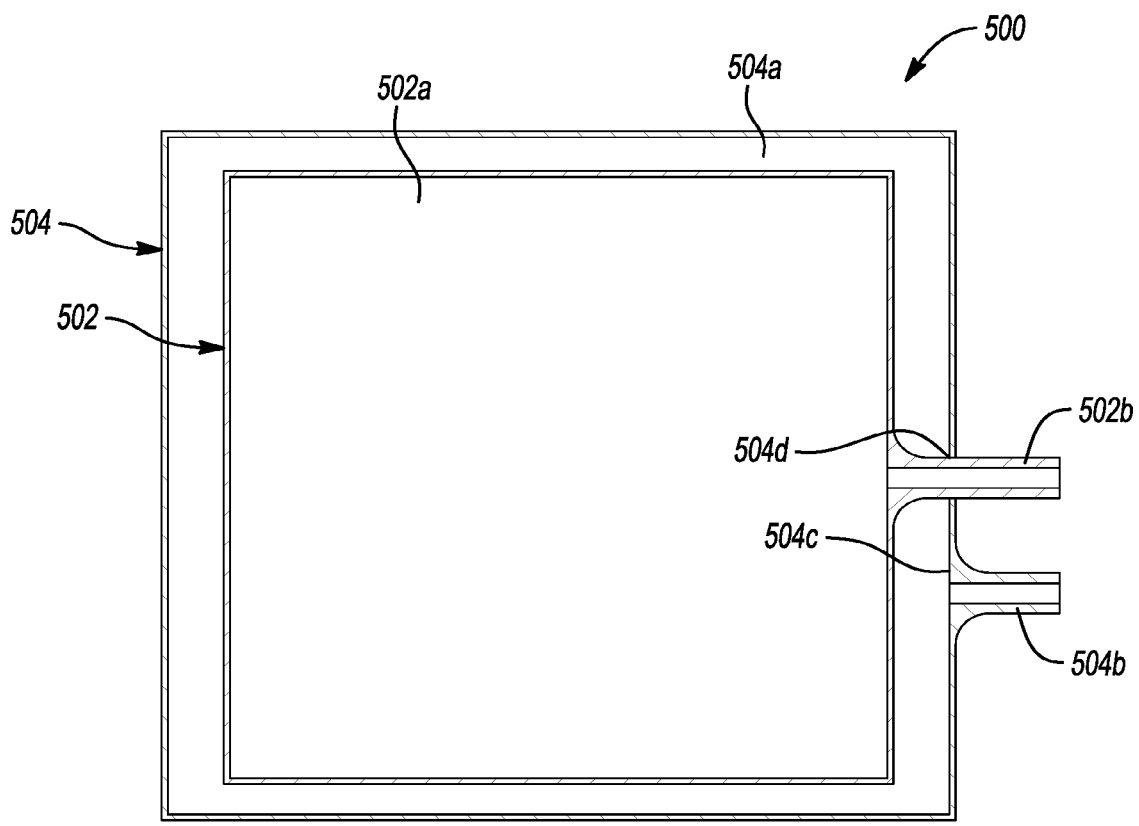
FIG. 14 is a side cross sectional view of the vacuum bag assembly of FIG. 13 taken in accordance with section line 14-14 in FIG. 13.

Referring briefly to FIGS. 13 and 14 show another embodiment of a dual vacuum bag assembly 500 in accordance with the present disclosure. The bag assembly 500 likewise includes an inner flexible bag 502 having a main portion 502a connected to a neck portion 502b, and an outer flexible bag 504 having a main portion 504a connected to a neck portion 504b. The bag assembly may be otherwise constructed in the same manner as described for the bag assembly 306 but in this embodiment the outer flexible bag includes openings adjacent one another along one long surface: one, opening 504c, for forming a flow path through the neck portion 504b, and another, opening 504d, enabling the neck portion 502b to project through the outer flexible bag 504. These openings 504c and 504d likewise need to be properly sealed to prevent any leakage from the outer flexible bag 504 to the ambient environment. This embodiment provides the convenience of having the two ports separated by a small distance so that the two interior chambers of the bags 502 and 504 can be communicated within a shorter structure, which allows for a more compact overall design.

Figure 15:
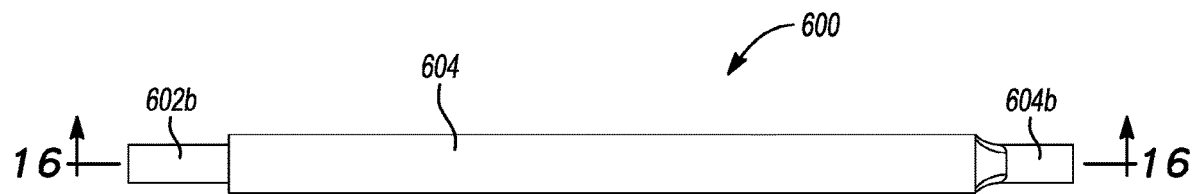
FIG. 15 is a top view of another embodiment of a dual vacuum bag assembly of the present disclosure.
Figure 16:
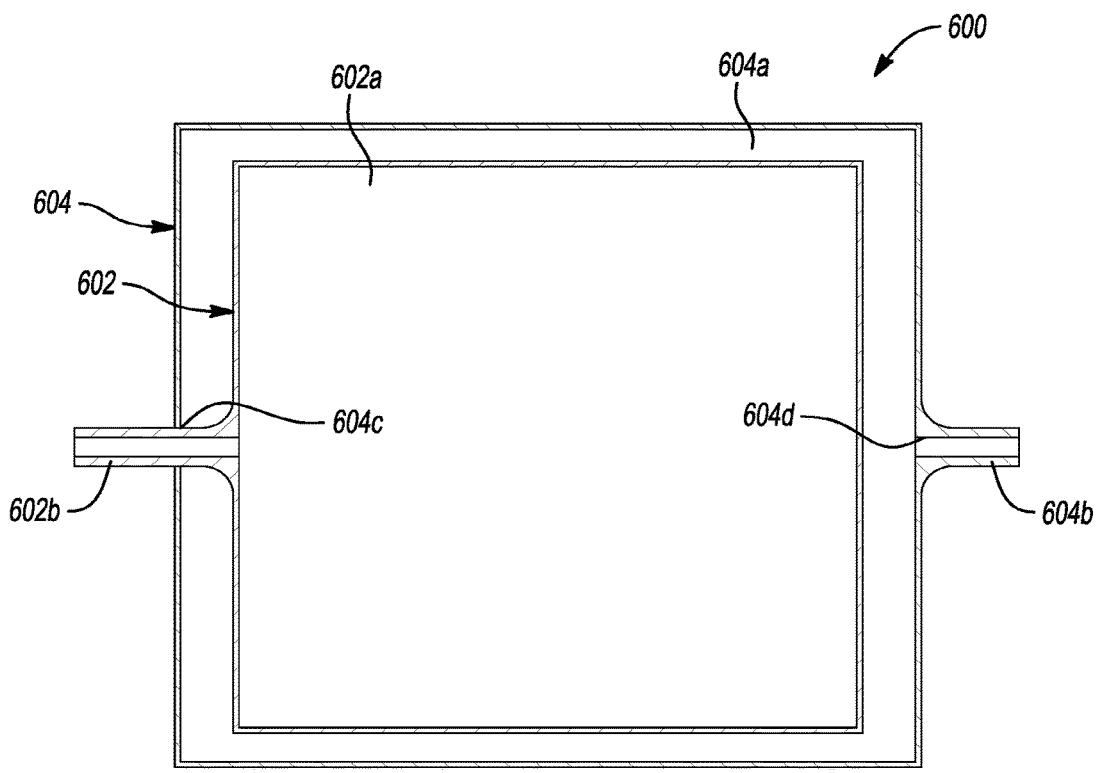
FIG. 16 is a side cross sectional view of the dual vacuum bag assembly taken in accordance with section line 16-16 in FIG. 15.

FIGS. 15 and 16 show a dual vacuum bag assembly 600 in accordance with yet another embodiment of the present disclosure. The bag assembly 600 is similar to the bag assembly 400 in that it includes a flexible inner bag 602 having a main portion 602a and a neck portion 602b connected thereto, as well as a flexible outer bag 604 having a main portion 604a and a neck portion 604b connected thereto. Openings 604c and 604d are associated with the neck portions 602b and 604b, respectively, and need to be properly sealed to prevent any leaking of the outer flexible bag 604 to the ambient environment. However, the neck portions 602b and 604b are arranged laterally opposed to one another at the 90 degree and 270 degree positions. Otherwise, the construction is identical to the bag assembly 400. This arrangement provides a port access on opposite sides of the bag assembly 600, which allows communication to the bags 602 and 604 on opposite sides of the bag assembly 600. This eliminates a need to create a pathway through the structure. In the case of measuring vacuum in a well, the flexible outer bag 604 would communicate with the well, which will compress the column in the flexible inner bag 602. This provides a positive pressure which can be scaled by the pressure sensor (e.g., Bosch GmbH pressure sensor) being used. The pressure sensor does not read a negative pressure. While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

The invention claimed is:

1. A fluid level sensing system for sensing a fluid level in a landfill well, the system comprising:
a housing assembly comprising a first housing and a second housing, the first housing in communication with the second housing, wherein the housing assembly is configured to be inserted into a landfill wellbore for exposure to landfill fluid in the landfill well and such that a first bore formed in the housing assembly is in communication with the landfill fluid in the well;
at least one of the first and second housings including a second bore isolated from the first bore and in communication with at least one of a vacuum gauge or an external vacuum source;

the first and second housings cooperating to define an interior area which houses a first enclosure and a second enclosure, with the first enclosure being housed within the second enclosure;
one of the first and second enclosures having a portion communicating with the first bore and configured to expand and contract in response to a change in pressure within the first bore caused by a changing fluid level in the well;
a portion of the other one of the first and second enclosures being in communication with the second bore and isolated from the first bore and configured to expand and contract in response to expansion and contraction of the one of the first and second enclosures to exert a reference pressure on the one of the first and second enclosures; and
a sensing subsystem responsive to expanding and contracting movement of the first and second enclosures, which generates a signal indicative of a change in a level of the fluid in the well.

2. The system of claim 1, wherein:
the portion of the one of the first and second enclosures comprises a first neck portion extending outwardly from the one of the first and second enclosures; and
the portion of the other one of the first and second enclosures comprises a second neck portion extending outwardly from the other of the first and second enclosures.

3. The system of claim 2, wherein the first neck portion is arranged coaxially within the second neck portion, such that only a single opening is formed in the second enclosure.

4. The system of claim 2, wherein the first and second neck portions are spaced apart from one another so as to be non-coaxial with one another.

5. The system of claim 1, wherein the sensing system includes a movable element responsive to expanding and contracting movement of the second enclosure.

6. The system of claim 1, wherein the first enclosure comprises a first flexible bag.

7. The system of claim 6, wherein the second enclosure comprises a second flexible bag.

8. The system of claim 2, wherein the second housing forms a multi-part assembly including:
an inlet housing; and
a sealing plate secured to the second housing component; and
the sealing plate including a neck portion for receiving the first and second neck portions coaxially therein.

9. A fluid level sensing system for sensing a fluid level in a landfill well, the system comprising:
a first housing having a first bore and a second bore extending therethrough, wherein:
the first housing is configured to be inserted into a landfill wellbore for exposure to landfill fluid in the landfill well and such that the first bore is in communication with the landfill fluid in the well; and
the second bore is configured to communicate with an ambient environment in the well to enable a controlled vacuum from an external vacuum source to be applied to the ambient environment within the well;
a sealing plate adapted to be secured to the first housing, the sealing plate including first and second bores in communication with the first and second bores, respectively, of the first housing, when the sealing plate and the first housing are secured together;
a second housing secured to the first housing;
a dual flexible assembly positioned within the second housing, the dual flexible assembly including first and second enclosures, with the first enclosure being housed within the second enclosure such that only a single opening is formed in the second enclosure;
the first enclosure including an opening and being in communication with the first bore in the first housing, and isolated from the second bore in the first housing, and configured to expand and contract in response to a change in pressure in the first bore of the first housing caused by a changing fluid level in the well;
the second enclosure including an opening coaxially arranged with the opening in the first enclosure, and being in communication with the second bore of the first housing, and isolated from the first bore of the first housing, and configured to expand and contract in response to the controlled vacuum to cause the second enclosure to act on the first enclosure and to exert a compressive reference pressure on the first enclosure as the first enclosure expands and contracts in response to the changing fluid level in the well;
a movable element housed in the second housing and movable in response to expanding and contracting movement of the first and second enclosures in response to the changing fluid level in the well; and
a sensor responsive to movement of the movable element for providing a signal indicative of movement of the movable element, the signal being indicative of a fluid level within the well at a given time.

10. The system of claim 9, wherein the first opening in the first enclosure comprises a neck portion which extends outwardly through the opening in the second enclosure.

11. The system of claim 10, wherein the opening in the second enclosure comprises a neck portion which extends into communication with the second bore in the sealing plate.

12. The system of claim 9, wherein:
the opening in the second enclosure comprises a second neck portion extending from the second enclosure; and
the opening in the first enclosure comprises a first neck portion extending out from the first enclosure coaxially through the second neck portion.

13. The system of claim 12, wherein a spacing between an outer surface of the first neck portion of the first enclosure, and an inner surface of the second neck portion of the second enclosure, forms part of the second bore of the sealing plate.

14. The system of claim 13, further comprising a first O-ring for providing a seal between an outer surface of the first neck portion and a portion of the first bore.

15. The system of claim 14, further comprising a second O-ring for providing a seal between an outer surface of the second neck portion and the sealing plate.

16. The system of claim 15, further comprising a third O-ring for providing a seal between the second housing assembly and the sealing plate.

17. The system of claim 9, wherein the first enclosure comprises a first flexible bag.

18. The system of claim 17, wherein the second enclosure comprises a second flexible bag.

19. The system of claim 9, wherein the second bore of at least one of the sealing plate or the first housing includes a radially extending portion which communicates with at least one of a vacuum gauge or the external vacuum source.

20. The system of claim 9, wherein:
the movable element forms a piston-like element in contact with the second enclosure, and which is movable axially within the second housing as the second enclosure expands and contracts; and the movable element includes a permanent magnet secured thereto, and the sensor comprises a sensor for generating an electrical output signal responsive to a change in a flux field of the permanent magnet as the permanent magnet moves axially within the second housing.

* * * * *